US 8,285,463 B2

(12) United States Patent
Moses et al.

(10) Patent No.: US 8,285,463 B2
(45) Date of Patent: Oct. 9, 2012

(54) METHOD AND SYSTEM FOR CALIBRATING A PRESSURE SENSOR FOR AN AUTOMATIC TRANSMISSION (75) Inventors: Robert L. Moses, Ann Arbor, MI (US); Ronald F. Lochocki, Jr., Ypsilanti, MI (US)

(73) Assignee: GM Global Technology Operations LLC

( * ) Notice: Subject to any disclaimer, the term of this patent is extended or adjusted under 35 U.S.C. 154(b) by 535 days.

(21) Appl. No.: 12/539,331

(22) Filed: Aug. 11, 2009

(65) Prior Publication Data
US 2011/0040463 A1 Feb. 17, 2011

(51) Int. Cl.
G06F 7/00 (2006.01)
G06F 17/00 (2006.01)
(52) U.S. Cl. ............ 701/63; 701/100; 477/45; 477/156; 60/420
(58) Field of Classification Search ............... 701/54, 701/62–63, 51, 68; 477/156, 115, 109, 158, 477/45, 174–176, 169; 475/123, 125; 192/3.3; 60/420
See application file for complete search history.

(56) References Cited

U.S. PATENT DOCUMENTS

| | | | | |
|---|---|---|---|---|
| 4,982,622 A * | 1/1991 | Yamamoto et al. | ............ | 477/117 |
| 5,033,598 A * | 7/1991 | Tipton | ........................ | 192/70.24 |
| 5,131,294 A * | 7/1992 | Yoshimura | ..................... | 477/109 |
| 5,484,354 A * | 1/1996 | Vukovich et al. | ............. | 477/174 |
| 5,531,302 A * | 7/1996 | Koenig et al. | .................. | 192/3.3 |
| 5,535,863 A * | 7/1996 | Vukovich et al. | ............... | 192/3.3 |
| 5,910,175 A * | 6/1999 | Malson | ............................ | 701/57 |
| 5,931,885 A * | 8/1999 | Kubo et al. | ..................... | 701/51 |
| 5,951,615 A * | 9/1999 | Malson | ............................ | 701/57 |
| 6,078,856 A * | 6/2000 | Malson | ............................ | 701/57 |
| 6,190,286 B1 * | 2/2001 | Ito et al. | ......................... | 477/160 |
| 6,602,161 B2 * | 8/2003 | Hemmingsen et al. | ......... | 477/79 |
| 6,751,542 B2 * | 6/2004 | Ishii et al. | ....................... | 701/51 |
| 6,947,821 B2 * | 9/2005 | Kim | ................................. | 701/51 |
| 7,507,182 B2 * | 3/2009 | Matsumura et al. | .......... | 477/174 |
| 7,556,120 B2 * | 7/2009 | Sah et al. | ....................... | 180/305 |
| 2002/0086769 A1 * | 7/2002 | Hemmingsen et al. | ......... | 477/79 |
| 2003/0187562 A1 * | 10/2003 | Ishii et al. | ....................... | 701/51 |
| 2005/0125129 A1 * | 6/2005 | Kim | ................................. | 701/51 |
| 2006/0178244 A1 * | 8/2006 | Whitton et al. | ............... | 477/181 |
| 2006/0185459 A1 * | 8/2006 | Matsumura et al. | ............ | 74/335 |
| 2007/0220879 A1 * | 9/2007 | Lochocki et al. | ............... | 60/459 |

(Continued)

FOREIGN PATENT DOCUMENTS

JP 63-173052 * 7/1988

(Continued)

OTHER PUBLICATIONS

Robust observer-based monitoring of a hydraulic actuator in a vehicle power transmission control system; Jin-Oh Hahn; Jae-Woong Hur; Young Man Cho; Kyo II Lee; Decision and Control, 2001. Proceedings of the 40th IEEE Conference on; vol. 1 Digital Object Identifier: 10.1109/.2001.980155; Publication Year: 2001 , pp. 522-528 vol. 1.*

(Continued)

Primary Examiner — Cuong H Nguyen (57) ABSTRACT

A method and control system for operating a transmission includes a transmission control module determining a transmission sensor signal and a transmission pressure sensor offset prior to starting a vehicle engine and an engine start initiator starting the vehicle engine. The transmission control module controls a transmission function in response the transmission pressure sensor offset and the pressure sensor signal.

19 Claims, 9 Drawing Sheets

U.S. PATENT DOCUMENTS

| | | | |
|---|---|---|---|
| 2008/0185251 A1* | 8/2008 | Thor | 192/3.63 |
| 2009/0005217 A1* | 1/2009 | Somerville et al. | 477/115 |
| 2010/0004830 A1* | 1/2010 | Shultz et al. | 701/51 |
| 2011/0040463 A1* | 2/2011 | Moses et al. | 701/63 |
| 2011/0105273 A1* | 5/2011 | Tabuchi et al. | 476/10 |

FOREIGN PATENT DOCUMENTS

| | | | |
|---|---|---|---|
| JP | 02-204995 | * | 8/1990 |
| JP | 8-109787 | * | 4/1996 |
| JP | 10-351110 | * | 12/1998 |
| WO | PCT/JP2006/320893 | * | 4/2008 |

OTHER PUBLICATIONS

Pressure-Based Clutch Control for Automotive Transmissions Using a Sliding-Mode Controller; Song, X.; Sun, Z.; Mechatronics, IEEE/ASME Transactions on; vol. PP , Issue: 99; Digital Object Identifier: 10.1109/TMECH.2011.2106507 Publication Year: 2011 , pp. 1-13.*

Improved fuzzy control of dual clutch transmission during launch process; Jinle Zhang; Biao Ma; Changsong Zheng; Hailing Zhang; Yingfeng Zhang; Mechatronics and Automation (ICMA), 2010 International Conference on; Digital Object Identifier: 10.1109/ICMA.2010.5588603; Publication Year: 2010 , pp. 676-681.*

Hydraulic system design for full hybrid transmission; Han Bing; Cai Yixi; Zhang Tong; Electric Information and Control Engineering (ICEICE), 2011 International Conference on; Digital Object Identifier: 10.1109/ICEICE.2011.5777088; Publication Year: 2011 , pp. 2256-2259.*

Identification of optimal control parameters for a pneumatic active engine mount system; Jae-Cheon Lee; Jae-Yong Choi; Jeong-Hoon Kim; Fluid Power and Mechatronics (FPM), 2011 International Conference on; Digital Object Identifier: 10.1109/FPM.2011.6045760; Publication Year: 2011 , pp. 217-221.*

CVT speed ratio control study on the dynamic performance compensation; Xia, Jingjing; Wang, Dong; Consumer Electronics, Communications and Networks (CECNet), 2012 2nd International Conference on; Digital Object Identifier: 10.1109/CECNet.2012.6201715; Publication Year: 2012 , pp. 2480-2482.*

Experimental Study on the Shift Control Characteristics of CVT using Embedded System; Kiwon Han; Wansik Ryu; In-Gyu Jang; Jaewook Jeon; Hyunsoo Kim; Sung-Ho Hwang; SICE-ICASE, 2006. International Joint Conference; Digital Object Identifier: 10.1109/SICE.2006.314925; Publication Year: 2006 , pp. 3652-3657.*

* cited by examiner

METHOD AND SYSTEM FOR CALIBRATING A PRESSURE SENSOR FOR AN AUTOMATIC TRANSMISSION

FIELD

The present disclosure relates to electro-hydraulic controls for power transmissions and, more particularly, to pressure regulator valve controls in power transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automatic shifting power transmissions include a hydraulic system, which supplies power to operate the various clutches and brakes and other elements within the transmission. The hydraulic pressure is limited or controlled in value to provide the most efficient operation that can be obtained.

In more recent transmissions, the hydraulic controls have been advanced to electro-hydraulic controls wherein electrical or electronic signals are available to assist in transmission controls. The electro-hydraulic controls generally comprise a solenoid valve, which receives various signals from a transmission control module (TCM) to supply a pressure signal to the various operating valves of the transmission.

An automatic transmission closed loop control system relies on pressure sensors to perform the closed loop portion of the control. These sensors can be comprised of a multitude of technologies and constructions, but all provide a signal indicative of fluid pressure of the circuit being measured. (See U.S. patent application Ser. No. 11/388,919 filed Mar. 24, 2006 entitled PRESSURE REGULATION IN AN AUTOMATIC TRANSMISSION). Algorithms exist for pressure sensor correction with respect to temperature. Such algorithms correct pressure sensor drift or offset over time due to sensor variation and degradation. The closed loop pressure system relies on accurate pressure sensing information to provide the improved accuracy desired.

SUMMARY

The present disclosure provides a method and system for determining a transmission pressure sensor offset that is used for controlling a transmission.

In one aspect of the disclosure, a method includes prior to starting a vehicle engine, determining a transmission pressure sensor offset. The method further includes starting a vehicle engine and controlling a transmission function in response to the pressure sensor offset.

In a further aspect of the disclosure, a control system includes a transmission control module determining a transmission pressure sensor offset prior to starting a vehicle engine and an engine start initiator starting a vehicle engine. The transmission control module controls a transmission function in response to the transmission pressure sensor offset.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1A:
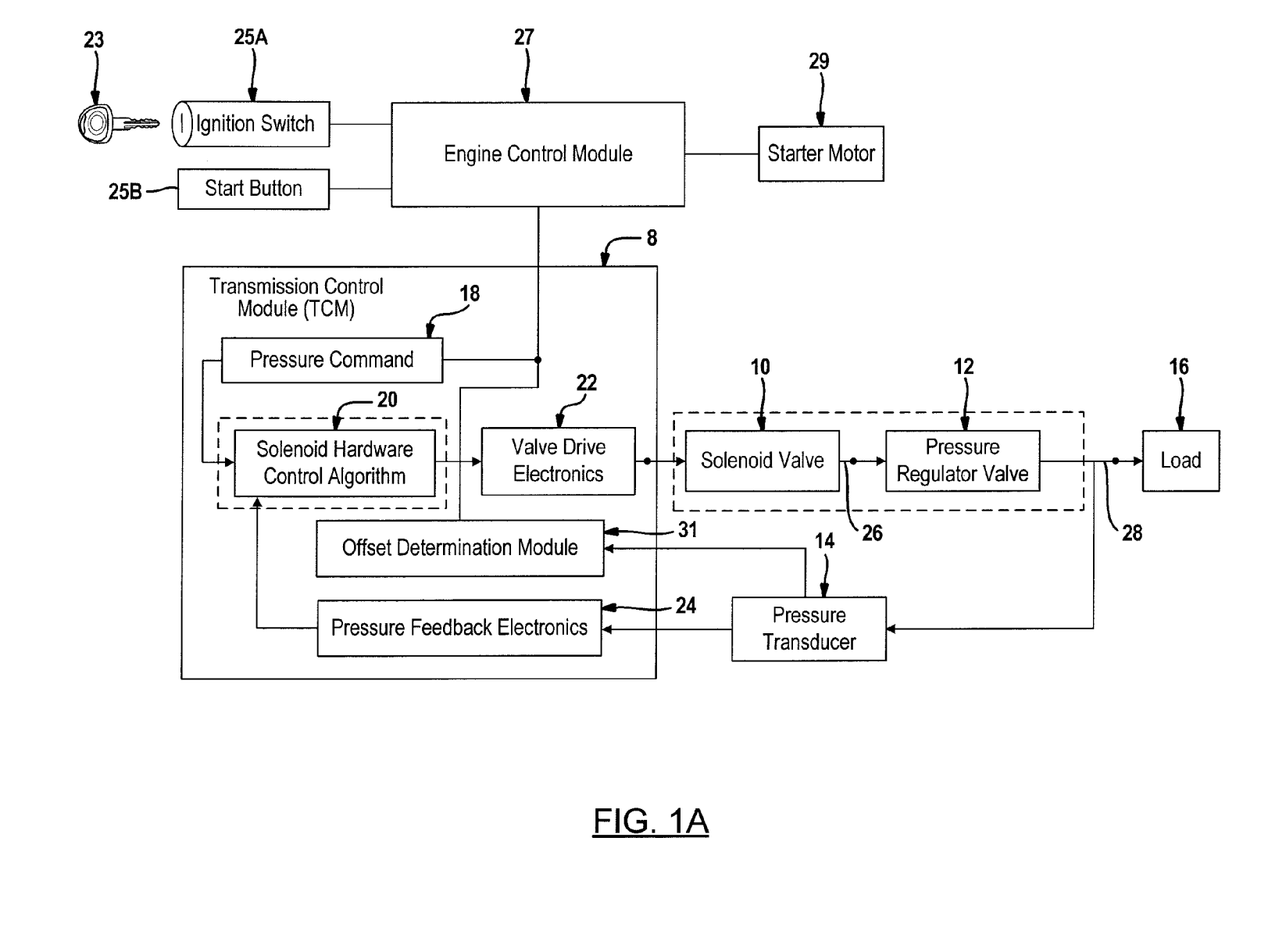
FIG. 1A is a diagrammatic representation of an electro-hydraulic control system according to the present disclosure.

Referring now to FIG. 1A, a diagrammatic representation is shown of a portion of a transmission control system incorporating a transmission control module (TCM) 8, a solenoid valve 10, a pressure regulator valve 12, a pressure transducer 14, and a load or transmission element 16. The transmission element 16 may be a conventional selectively operable torque-transmitting mechanism such as a clutch or brake for controlling the ratio within the transmission or, a torque converter clutch for controlling the efficiency of a torque converter. The hydraulic pressure of the system hydraulically controls many aspects of the transmission operation, as will be described below.

The TCM 8 includes a plurality of command signals such as throttle position, torque demand, vehicle speed, engine speed, and other characteristics or parameters of the powertrain. The pressure command is issued by a main transmission control 18 to the solenoid valve hardware control algorithm 20. The control algorithm 20 supplies output signals in electronic form to valve drive electronics 22. The TCM 8 also includes some conventional electronics that provide feedback signals to the correction device 18.

The TCM 8 also includes a conventional pre-programmable digital computer, which is the main operating base for the output signals. The valve drive electronics 22 issues signals to the solenoid valve 10, which in turn issues a pressure signal through a passage 26 to the pressure regulator valve 12. In an optional construction, the solenoid and regulator valve can be combined in a conventional high flow solenoid valve. The pressure regulator valve 12 provides an output pressure fluid in a passage 28, which is directed to the transmission element 16 and also to the pressure transducer 14. The pressure transducer 14 directs an electronic signal through the pressure feedback electronics 24 in the TCM. This provides a closed loop control regulator within the transmission control system.

The control algorithm 20 calculates an electronic signal in a conventional manner for the solenoid valve, which in turn provides the pilot pressure to the pressure regulator valve 12. The pressure regulation valve will respond to the pilot pressure to control the output pressure to the transmission element 16.

The pressure in passage 28 is also directed to the pressure transducer 14, which issues an electronic signal back through the TCM 8 to the solenoid hydraulic control algorithm 20. If the signal received at error correction device 18 suggests that the output pressure of the regulator valve 12 is different from the pressure commanded in the transmission control module, a proper selection signal is generated in the control algorithm 20 to provide an output signal which will change the regulated pressure in passage 28 to a level commensurate or agreeable with the pressure commanded by the TCM 8.

The transmission control module 8 may be in communication with an engine control module 27. The engine control module 27 may perform various functions including the controlling of various parameters for operating the engine. The engine control module 27 may have a starter motor 29 in communication therewith. The starter motor 29 may be a stand-alone starter motor or may be a starter motor incorporated into the transmission such as in a hybrid vehicle. The starter motor 29 may be activated in response to an ignition switch 25A. The ignition switch 25A may have various positions that correspond to an on position, an off position and an accessory drive position. The ignition switch 25A may be activated by a key 23. An ignition switch signal 25A may directly be communicated to the starter motor 29 or may be indirectly communicated to the starter motor 29 through the engine control module 27.

A start button 25B may generate a start signal corresponding to a desire to start the engine using the starter motor 29. The start button 25B may be for a keyless starting system or remote starting system. As will be described below, a pressure transducer offset is determined prior to starting of the vehicle when it is known that the transmission pressure is at rest or at zero.

An offset determination module 31 is in communication with the pressure transducer 14. The offset determination module may be located within the transmission control module 8. In addition, the offset determination module may be located in other modules such as the engine control module 27. In addition, the offset determination module may be located in an ASIC of the pressure sensor 14. Prior to the vehicle, a start initiator such as the ignition switch 25A or 25B, may be used to actuate or initiate the starting process. In theory, the pressure transducer should read zero when the transmission oil pump and the engine are not rotating. The offset determination module may provide pressure transducer offset to the pressure command module 18. Thus, the pressure offset may be incorporated into a pressure command signal to compensate for any pressure transducer offset.

Figure 1B:
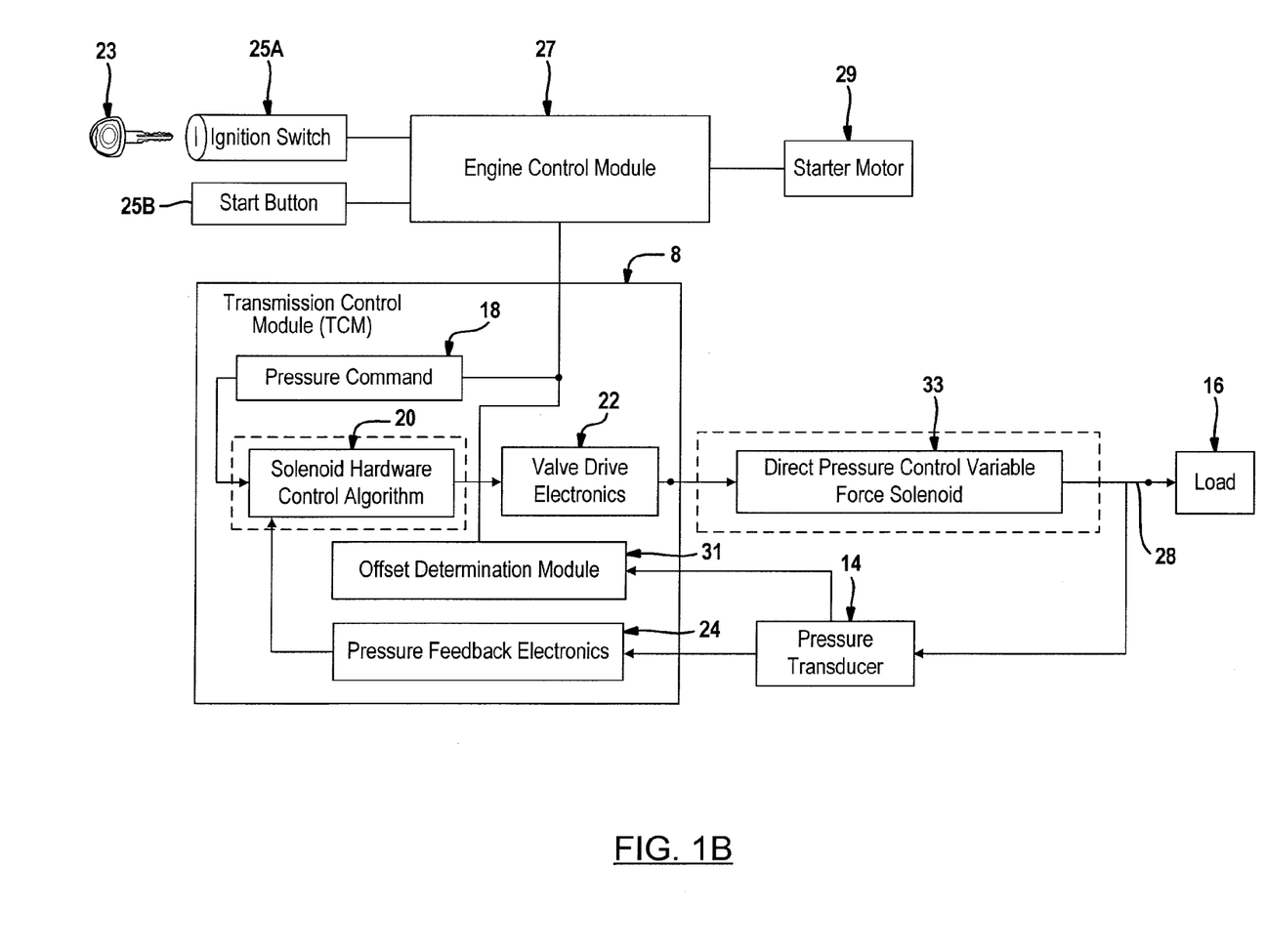
FIG. 1B is a diagrammatic representation similar to FIG. 1A with the solenoid valve and pressure regulator valve replaced by a direct pressure control variable force solenoid.

FIG. 1B is identical to FIG. 1A except the solenoid valve 10 and pressure regulator valve 12 are replaced by a direct pressure control variable force solenoid 33.

Figure 2:
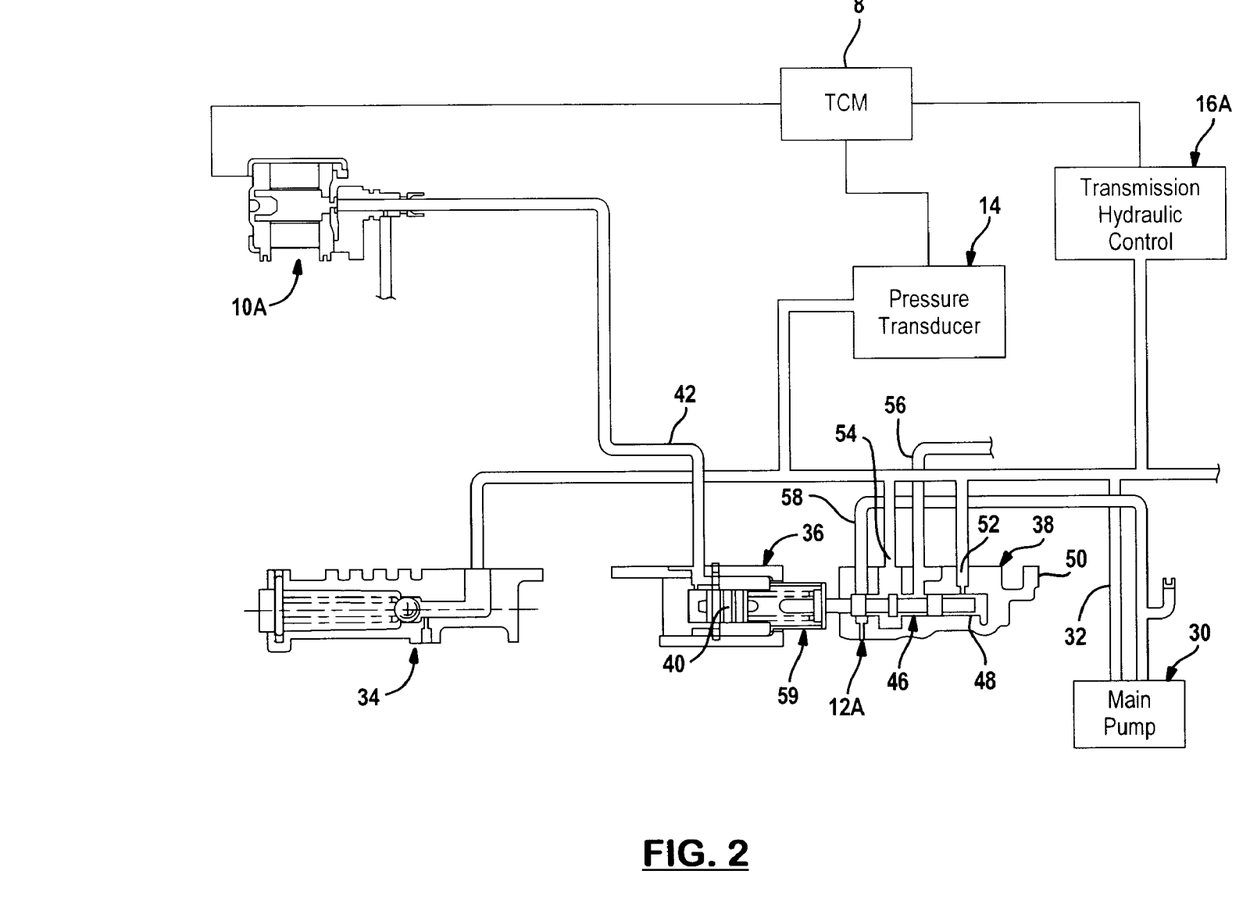
FIG. 2 is a schematic and diagrammatic representation of a portion of a hydraulic control system incorporating one embodiment of the present disclosure.

Referring now to FIG. 2, a portion of a hydraulic control system for a transmission is illustrated including a conventional hydraulic pump 30 which delivers fluid pressure to a main line passage 32. The line passage 32 is connected to a transmission element or hydraulic control 16A, which establishes a load on the pump 30 and therefore a pressure level within the hydraulic system. The main line 32 is connected with the pressure transducer 14, a pressure regulating valve 12A and a maximum pressure or blow-off valve 34. The blow-off valve 34 is a conventional pressure-regulating valve, which limits the maximum pressure within the system.

The regulating valve 12A includes a pilot portion 36 and a regulating valve portion 38. The pilot portion 36 includes a shuttle valve or plug valve 40, which is in fluid communication through a passage 42 with a solenoid control valve 10A. The solenoid control valve, as explained above with FIG. 1A, receives signals from the TCM to establish the pressure level within the system. The shuttle valve or plug valve 40 operates through a spring 59 on the end of a valve spool 46, which is a portion of the regulator valve 38. The valve spool 46 is slidably disposed in a valve bore 48, which is part of a conventional valve body 50 or in the pump body. The valve body 50 has two ports 52 and 54, which admit line pressure to the valve bore 48 and a converter feed line or passage 56 and a return line or exhaust passage 58.

The spring 59 imposes a bias on the valve spool 46 such that the valve spool 46 is controlled and positioned to establish the pressure within the main line 32. The port 52 of the main line 32 operates on the right end of the valve spool 46 to balance the spring load established by the pilot valve 40. If the line pressure at passage 32 is greater than the line pressure commanded by the TCM through the solenoid 10A, the valve spool 46 will be urged leftward against the spring to exhaust excess fluid within the system through the passage 58.

The passage 56 supplies fluid pressure through a transmission control which then directs the fluid to a conventional torque converter, not shown. The fluid in passage 54 is open to the pressure transducer 14 as well as to the control or transmission element 16A. The pressure in passage 54 causes the pressure transducer 14 to issue a signal to the TCM 8 thereby assuring that the pressure in the passage 54 is commensurate with the pressure commanded by the TCM 8 for proper operation of the transmission element 16A. The TCM 8, as previously explained, receives signals from various vehicle-operating mechanisms or sensors such as engine speed, drive position, vehicle speed, torque command, and other items. The TCM 8 also receives signals from the transmission hydraulic control 16A to assure that the transmission is operating in the desired speed ratio or drive ratio established by the operator.

Figure 3A:
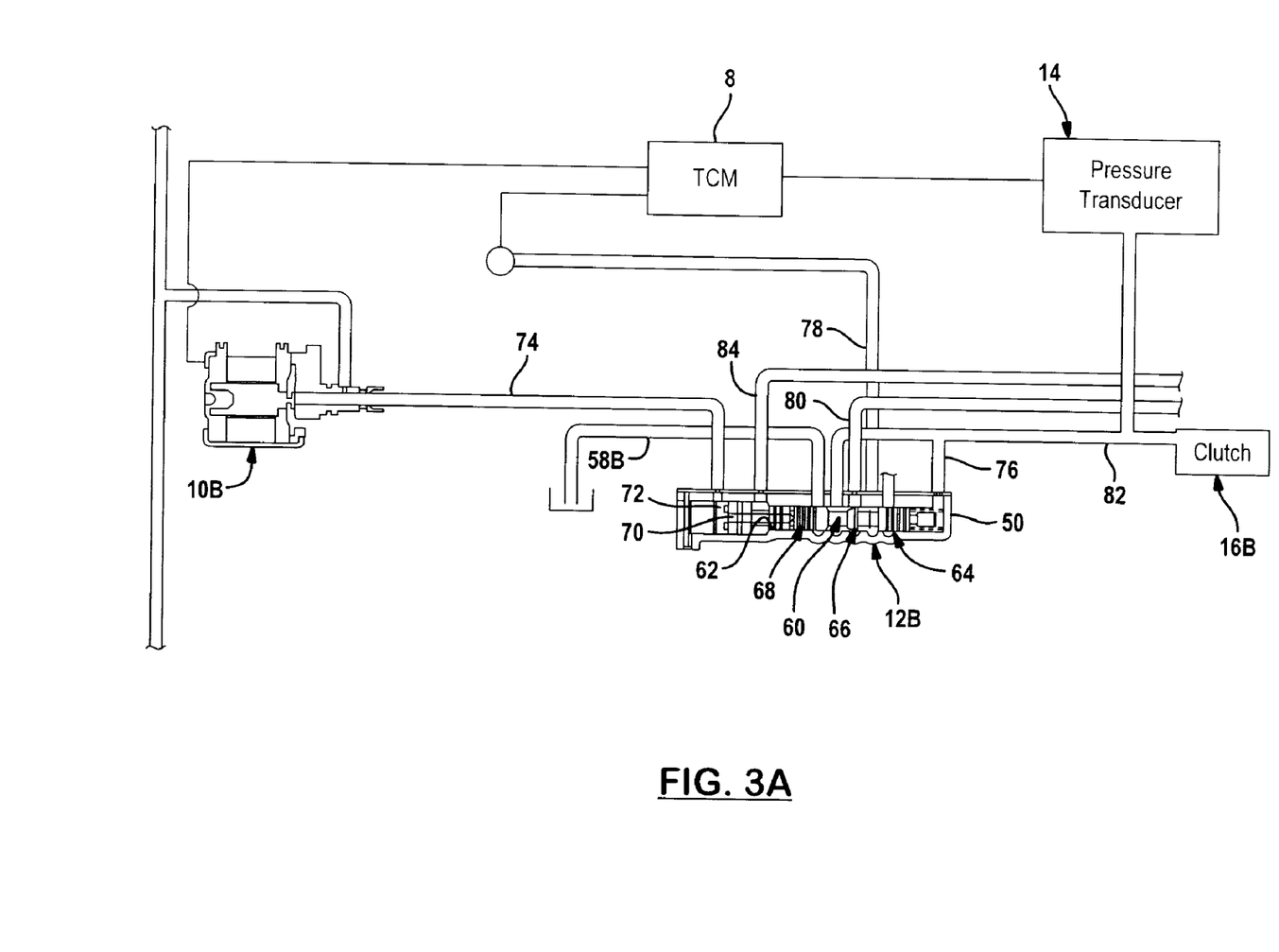
FIG. 3A is a diagrammatic representation of a portion of a hydraulic control system incorporating another embodiment of the present disclosure.

Referring now to FIG. 3A, a pressure regulator valve 12B, which includes a valve spool 60 slidably disposed in a valve bore 62 formed in the valve body 50, is illustrated. The valve spool 60 has three lands 64, 66, and 68 and a diameter land 70. The diameter land 70 cooperates with the left end of the valve bore 62 to form a pilot chamber 72. The pilot chamber 72 is connected with the solenoid valve 10B leading to a passage 74.

The valve bore 62 is also in fluid communication with a feed passage 80, a clutch apply passage 82, an optional passage 84, an exhaust passage 58B, and a feedback passage 76. The feedback passage 76 communicates with the clutch apply passage 82 to provide a signal to the right end of valve spool 60 to signal that the desired pressure is present at the transmission element 16B.

The passage 82 communicates with the transmission element 16B, which may be a torque-transmitting mechanism such as a clutch or a brake. The passage 82 also communicates with the pressure transducer 14 such that the actual pressure at the transmission element 16B can be communicated with the TCM 8. The fluid pressure in chamber 72, of course, communicates the command signal from the TCM to the regulator valve 12B. The fluid in passage 84 is an optional signal from another operating device within the transmission, which will reduce the pressure in the transmission element 16B when desired. As with the pressure regulator valve 12A, the regulator valve 12B issues a pressure control signal to a device within the transmission and the pressure issued thereby is directed through a pressure transducer back to the TCM 8 so that regulation of the pressure in the transmission element 16B can be controlled within the parameters set by the TCM 8.

Figure 4A:
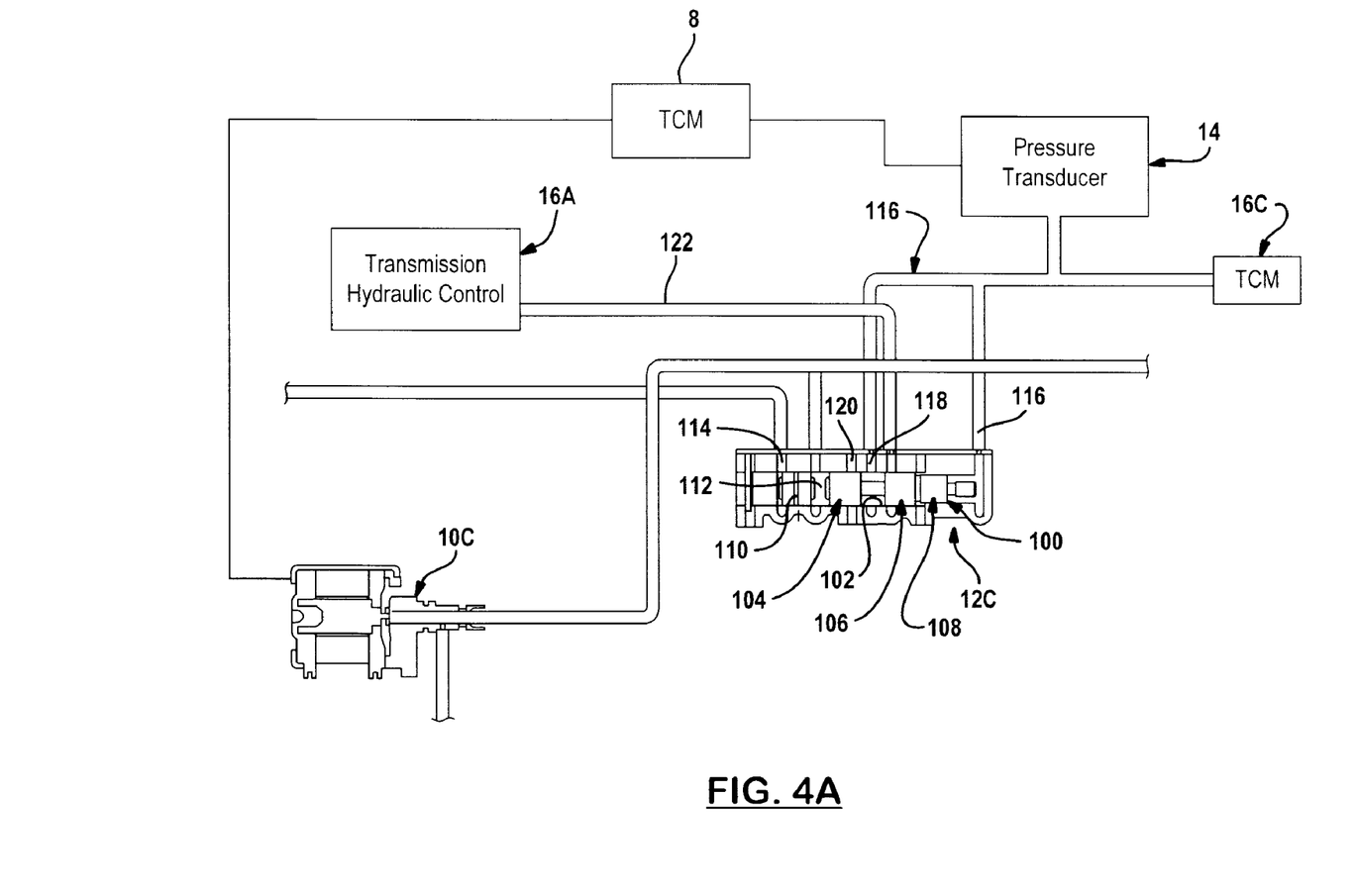
FIG. 4A is a block diagrammatic representation view of a control module formed according to yet another embodiment of the present disclosure.
Figure 4B:
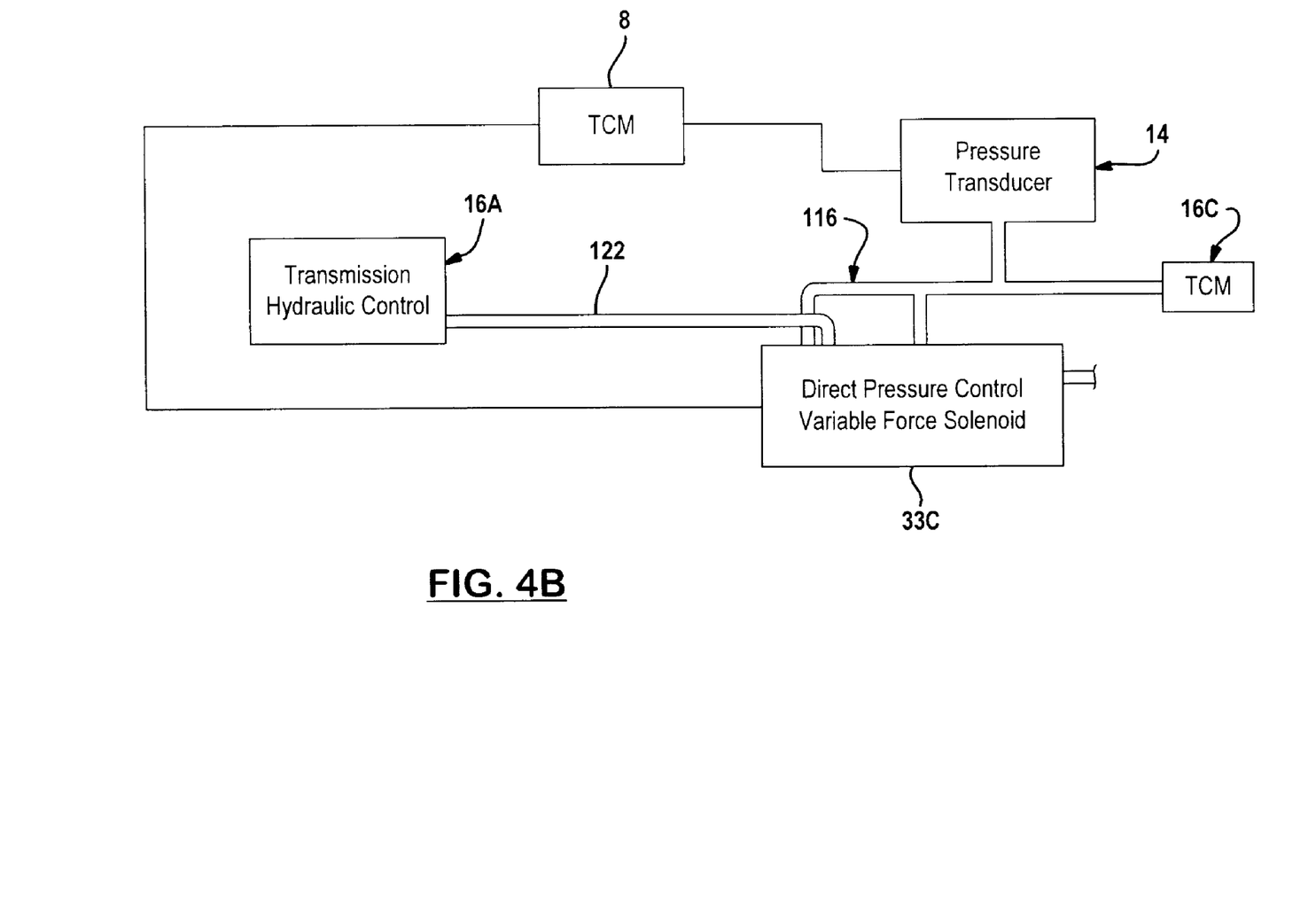
FIG. 4B is a diagrammatic representation similar to FIG. 4A with the solenoid valve and pressure regulator valve replaced by a direct pressure control variable force solenoid.

A torque converter regulator valve 12C is shown in FIG. 4[A or B]. The regulator valve 12C includes a valve spool 100 slidably disposed in a valve bore 102. The valve spool 100 has three lands 104, 106, and 108. The regulator valve 12C also includes a plug or shuttle valve 110. The shuttle valve 110 operates within the valve bore 102 to provide two control chambers 112 and 114.

The control chamber 112 is in fluid communication with the solenoid valve 10C, which receives a control signal from the TCM. The chamber 114 receives a signal from a separate solenoid control valve, not shown, which supplies signals for purposes other than the regulation. The valve bore 102 communicates with a torque converter apply passage 116 at two ports 116 and 118, and a pressure supply passage 122, which is connected with the transmission element 16A to receive input pressure therefrom. The pressure in passage 122 is controlled by the regulation system shown in FIG. 2.

The valve bore 102 is also connected with an exhaust port 120, which will limit or return the excess fluid applied to the valve to the transmission sump. The fluid pressure in port 118 and passage 116 is supplied to a conventional transmission element such as a torque converter clutch 16C. The pressure in passage 116 is also directed to the pressure transducer 14 for controlling the signal issued back to the TCM 8 to establish any change in pressure regulation as required by the transmission system. The pressure in passage 116 is also directed back to the valve bore 102 to operate on the right end of the regulator valve 12C to reduce the output pressure in accordance with the required signal from the TCM 8.

Figure 3B:
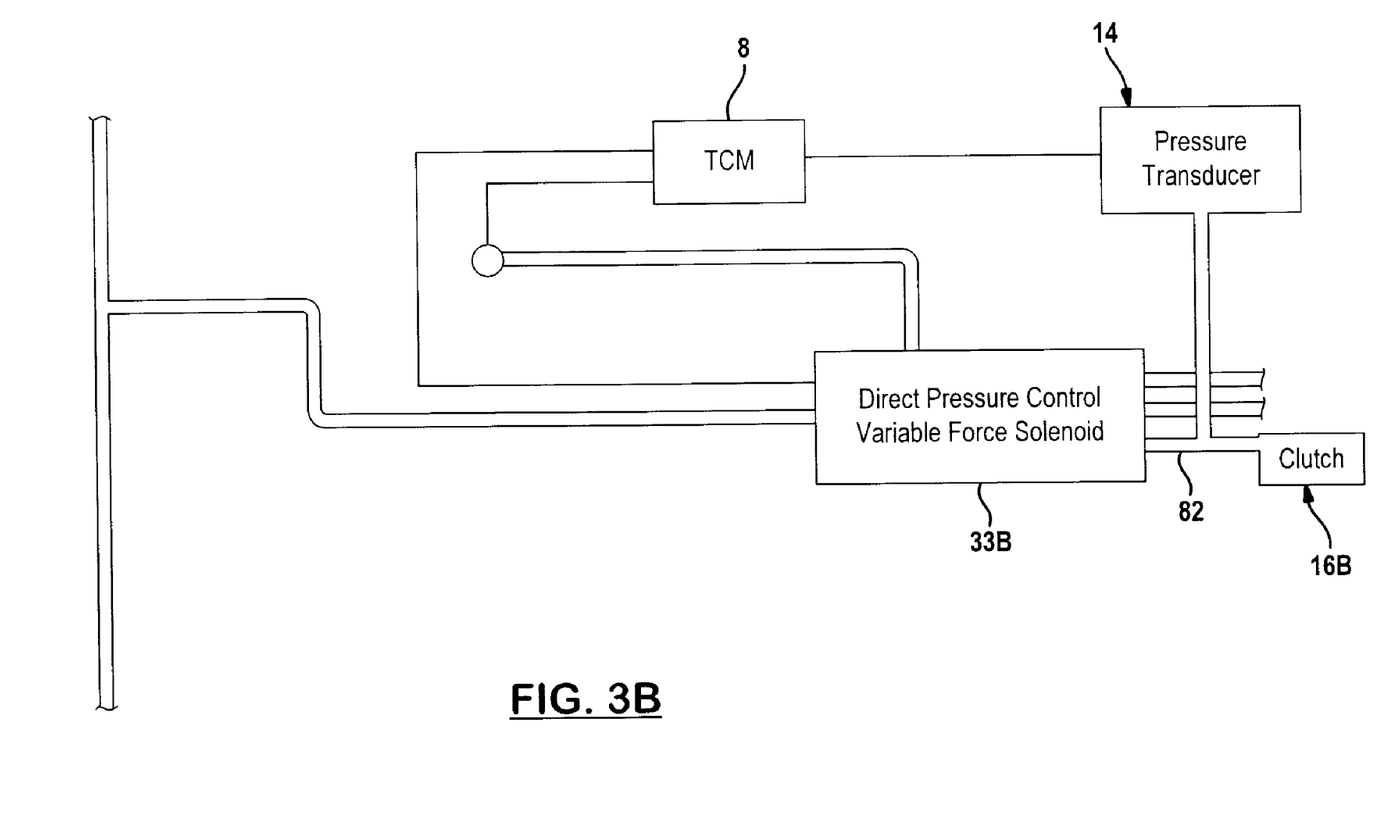
FIG. 3B is a diagrammatic representation similar to FIG. 3A with the solenoid valve and pressure regulator valve replaced by a direct pressure control variable force solenoid.

FIG. 3B is similar to FIG. 3A except the solenoid 10B and pressure regulator valve 12B are replaced by a direct pressure control variable force solenoid.

Those skilled in the art will now recognize that the type of pressure regulating systems shown in FIGS. 2, 3, and 4 are in accordance with the pressure regulation schedule described in the description of FIG. 1A. The regulation systems described in FIGS. 2, 3A and B, and 4A and B represent the various pressure regulation system, clutch and brake systems, and torque converter clutch system within a transmission.

For example, FIG. 2 represents the conventional pressure regulation of a transmission control with improved electronic mechanisms and pressure mechanisms to provide closed-loop control for the pressure regulation. The system shown in FIG. 3A uses pressure to control the engagement and disengagement of a conventional fluid-operated clutch and the regulation system shown in FIG. 4A is a control for a conventional torque converter clutch. In each of these systems, however, the closed-loop control of pressure as illustrated in either FIGS. 1A or 1B is incorporated. It is the closed-loop control described in FIGS. 1A/B and employed in FIGS. 2, 3A/B, and 4A/B that provides improved pressure regulation within the various transmission systems. It is precisely the closed-loop control, which establishes the desired control.

FIG. 4B includes a direct pressure control variable force solenoid 33C that replaces the solenoid valve 10 and the pressure regulator valve 12C.

Figure 5:
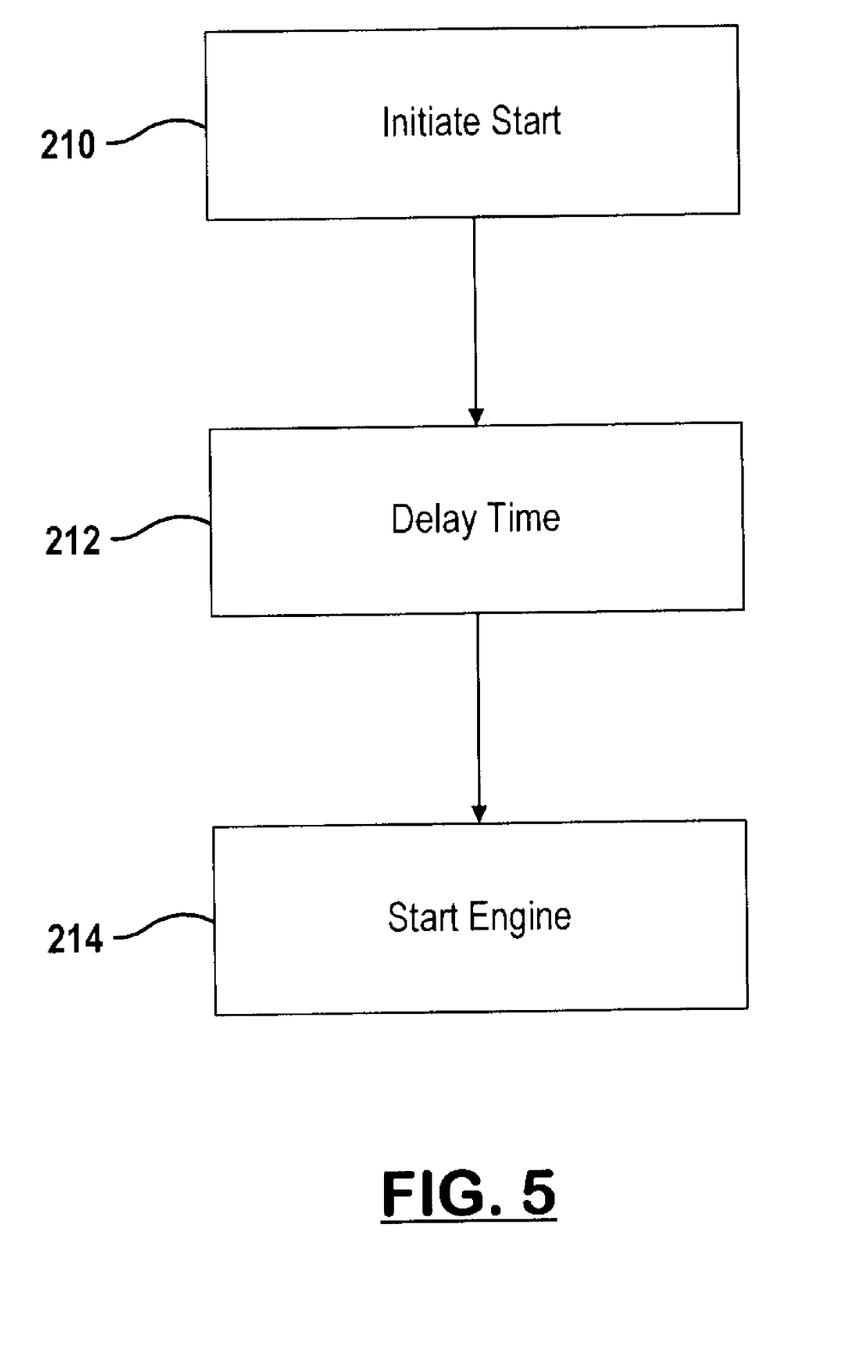
FIG. 5 is a flowchart of a method for controlling starting of the engine.

Referring now to FIG. 5, a flowchart of a general method for starting the engine is set forth. In step 210, the starting of the engine is initiated by activating one of the ignition switches or start buttons. In step 212, a delay time may be activated before starting the engine in step 214. The delay time may correspond to the wake-up time for the sensor electronics and time associated with performing a sensor reading. The delay time may also correspond to an auto-calibration routine that may be imparted into the system before the vehicle is allowed to start. The delay time may be incorporated into the ignition system through the engine control module 27 illustrated in FIGS. 1A and 1B.

Figure 6:
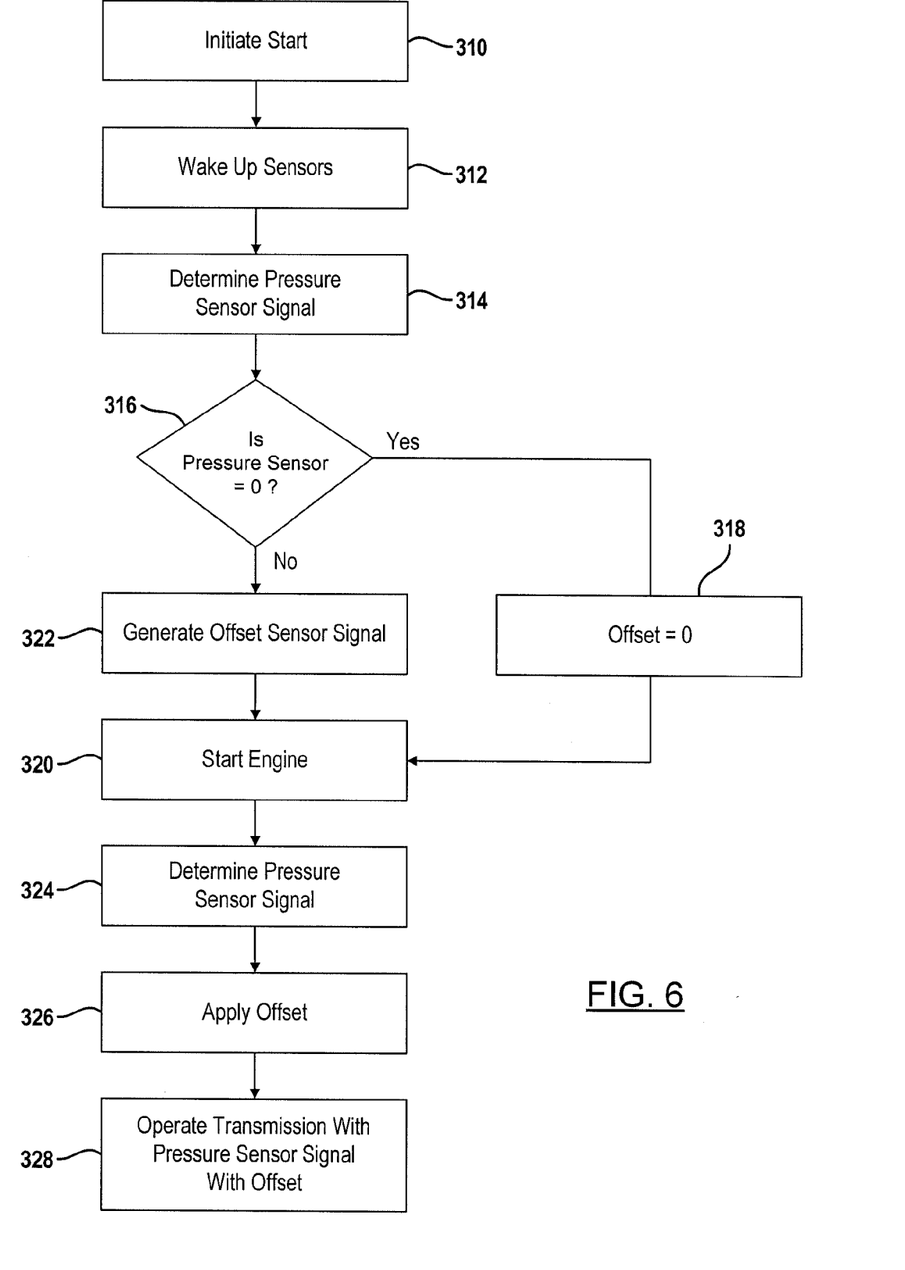
FIG. 6 is a detailed flowchart of a method of determining a pressure sensor offset and starting the engine.

Referring now to FIG. 6, a detailed method for starting the vehicle and determining a pressure transducer offset is set forth. Prior to the operation of the transmission, the pressure read by the sensor should be zero. In step 310, starting is initiated by inserting a key, remote starting or by pressing the start button as described above in FIGS. 1A/B. In step 312, the sensors and associated electronics may be energized or awakened. In step 314, a pressure sensor signal is determined. If the pressure sensor signal is zero in step 316, a pressure sensor offset is determined to also be zero in step 318. The system then proceeds with starting of the engine in step 320.

Referring back to step 316, if the pressure sensor is not equal to zero, step 322 generates an offset sensor signal that corresponds to a setting that, when added to the sensor signal, zeros the sensor signal. In step 324, the pressure from the pressure sensor is determined. The pressure sensor signal is corrected with the pressure offset in step 326 to form a corrected offset pressure sensor signal. In step 328, the transmission is operated with the corrected sensor signal corresponding to the pressure sensor signal and the pressure offset signal.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   prior to starting an engine of a vehicle:
      receiving a pressure measured using a transmission pressure sensor; and
      determining a pressure offset for the pressure based on the pressure measured prior to the starting of the engine;
   starting the engine after the determining of the pressure offset; and
   after the starting of the engine:
      receiving the pressure measured using the transmission pressure sensor;
      generating a corrected pressure based on the pressure measured after the starting of the engine and the pressure offset; and controlling a solenoid valve of a transmission based on the corrected pressure.

2. A method as recited in claim 1 further comprising delaying the starting of the engine until the pressure offset is determined.

3. A method as recited in claim 2 wherein delaying starting of the engine comprises delaying starting of the engine for a predetermined period.

4. A method as recited in claim 3 wherein the predetermined period corresponds to a calibration routine period.

5. A method as recited in claim 1 further comprising controlling the solenoid valve of the transmission further based on a commanded pressure at the transmission pressure sensor.

6. A method as recited in claim 5 further comprising controlling the solenoid valve of the transmission in closed-loop based on the corrected pressure and the commanded pressure.

7. A method as recited in claim 1 further comprising determining the pressure offset based on zero and the pressure measured prior to the starting of the engine.

8. A method as recited in claim 1 further comprising determining the pressure offset such that a sum of the pressure offset and the pressure measured prior to the starting of the engine is equal to zero.

9. A method as recited in claim 1 further comprising setting the corrected pressure equal to the pressure measured after the starting of the engine plus the pressure offset.

10. A control system comprising:
a transmission control module that, prior to starting of an engine of a vehicle:
receives a pressure measured using a transmission pressure sensor; and
determines a pressure offset for the pressure based on the pressure measured prior to the starting of the engine; and
an engine start initiator that starts the engine after the determination of the pressure offset;
wherein, after the starting of the engine, the transmission control module:
receives the pressure measured using the transmission pressure sensor;
generates a corrected pressure based on the pressure measured after the starting of the engine and the pressure offset; and
controls a solenoid valve of a transmission based on the corrected pressure.

11. A control system as recited in claim 10 further comprising an engine control module associated with the engine start initiator that delays the starting of the engine until the pressure offset is determined.

12. A control system as recited in claim 11 wherein the engine control module delays the starting of the engine for a predetermined period.

13. A control system as recited in claim 12 wherein the predetermined period corresponds to a calibration routine period.

14. A control system as recited in claim 10 further comprising a starter motor associated with the engine start initiator for starting the engine.

15. A control system as recited in claim 10 wherein the transmission control module controls the solenoid valve of the transmission further based on a commanded pressure at the transmission pressure sensor.

16. A control system as recited in claim 15 wherein the transmission control module controls the solenoid valve of the transmission in closed-loop based on the corrected pressure and the commanded pressure.

17. A control system as recited in claim 10 wherein the transmission control module determines the pressure offset based on zero and the pressure measured prior to the starting of the engine.

18. A control system as recited in claim 10 wherein the transmission control module determines the pressure offset such that a sum of the pressure offset and the pressure measured prior to the starting of the engine is equal to zero.

19. A control system as recited in claim 10 wherein the transmission control module sets the corrected pressure equal to the pressure measured after the starting of the engine plus the pressure offset.

* * * * *